3,763,073
ADHESIVE COMPOSITIONS
Gaylen M. Knutson, Yorba Linda, Calif., assignor to Union Oil Company of California, Los Angeles, Calif.
No Drawing. Filed Apr. 20, 1971, Ser. No. 135,745
Int. Cl. C08f 45/24
U.S. Cl. 260—29.6 R                                                    13 Claims

ABSTRACT OF THE DISCLOSURE

A process for the production of an aqueous emulsion of an ethylene-vinyl acetate copolymer is disclosed wherein the polymerization is performed in the presence of a plasticizer comprising an ester of a monobasic acid and a glycol. The presence of the plasticizer during polymerization significantly improves the adhesion of films prepared from the polymer. The polymerization is performed under an ethylene pressure of from 100 to 1000 p.s.i.g., sufficient to incorporate from 1 to 20 weight percent ethylene in the final copolymer product and is carried out until the total free monomer content of the emulsion is reduced to below about 1 weight percent. Conventional free radical initiation of the polymerization reaction is used.

DESCRIPTION OF THE INVENTION

This invention relates to an improved adhesive composition and method for making the same. More particularly, this invention relates to an adhesive composition having improved adhesion to vinyl plastics and glass and to a process for making the same.

Recent commercial applications of adhesives have increased the demand for adhesives having quite selective properties. A few of these properties, which many applications now require, include high moisture resistance, low flammability, low biological toxicity, etc. In addition it is generally advantageous to select adhesives which do not crystallize and become brittle and which can be applied at ambient temperatures.

A particularly desirable property which has heretofore been difficult to obtain with conventional adhesives is a good adhesion to vinyl plastics. The development of adhesives having this property has attracted considerable attention because of the ubiquity of the vinyl plastics, such as polyvinyl chloride and polyvinyl acetate.

Many adhesives possess some of the above desired properties but are lacking in others. For example, proteinaceous adhesives generally have good adhesion and can be applied at ambient temperatures but are highly susceptible to moisture and thus are quite inadequate in a moist environment. Another common adhesive which has good adhesive properties is a solution of polyacrylates in an organic solvent; however, this adhesive is usually flammable and toxic and exhibits a detrimental effect on plastics by causing swelling or solvation. Another adhesive which has good moisture resistance and low flammability is an ethylene-vinyl acetate copolymer having high ethylene content. This adhesive, however, must be melted before its application to the desired surfaces, and many surfaces such as paper products and some plastics cannot be heated sufficiently without partial or total destruction. Attempts to emulsify the high ethylene content copolymers to provide a latex adhesive, which can be applied at ambient temperatures have been relatively unsuccessful.

Recently, an emulsion of an ethylene-vinyl acetate copolymer having a low ethylene content and containing a polyvinyl alcohol protective colloid has been introduced to the adhesives market. This emulsion is suitable for many purposes, however, films from the emulsion lack adequate adhesion to vinyl plastics. The need therefore still exists for an adhesive for vinyl plastics which possesses the aforementioned properties. The adhesive should also have a low biological toxicity, and should not cause swelling or solvation of the plastic products.

Accordingly, an object of this invention is to provide an improved adhesive.

Another object of this invention is to provide a latex of an ethylene-vinyl acetate copolymer having improved adhesive properties.

Another object of this invention is to provide an adhesive emulsion that can be applied at ambient temperatures and that has an excellent adhesion to vinyl plastics.

A further object of this invention is to provide an improved method of making the aforementioned emulsion.

Other objects and advantages of this invention will be apparent to those skilled in the art from the description thereof which follows.

The aforesaid objects and their attendant advantages can be attained with an aqueous ethylene-vinyl acetate copolymer emulsion having a low ethylene content and formed by the emulsion polymerization of ethylene and vinyl acetate in the presence of an ester type plasticizer.

The ester type plasticizers which are present during the polymerization of the ethylene and vinyl acetate in accordance with this invention are esters of monobasic acids and difunctional alcohols. These materials are described in greater detail hereinafter.

The polymerization of the aforementioned monomers is performed by emulsion polymerization in which the ethylene and vinyl acetate monomers are contacted with an aqueous liquid polymerization medium. The vinyl acetate can be suspended or dispersed in aqueous medium and subjected to polymerization while the aqueous medium is maintained under an ethylene pressure to promote ethylene solubility in the reaction medium and copolymerization with the vinyl acetate monomer. This polymerization is generally performed by batch processing, however, continuous processing can be employed if desired. The reactor used for the polymerization can be a jacketed kettle having stirring means with provisions to circulate a cooling medium through the jacket of the kettle to maintain tthe desired temperature. The aqueous medium is stirred to maintain dispersion of the monomers. A suitable emulsifying agent of the anionic or nonionic types or combinations thereof can be used in the polymerization, and the amount of emulsifying agent is generally from about 0.01 to about 5, preferably from 2 to about 8 weight percent of the monomers used in the polymerization.

A water soluble, free radical catalyst such as a water soluble peracid or salt thereof is used as the initiating catalyst and this can be used alone or in combination with an active reducing agent in a redox couple. The catalyst is used in concentrations from about 0.01 to about 2, preferably from about 0.1 to about 0.5 weight percent of the comonomers used in the copolymerization.

If desired, a polymerization medium can also contain a minor quantity, e.g., from about 0.1 to about 5.0 weight percent of a protective colloid to improve the adhesiveness of the copolymer.

Various other ingredients can be used in the copolymerization such as buffering agents to control the pH of the reaction at a value from about 2.0 to 9.0 and, most preferably, from about 2.5 to 5.0. Suitable agents comprise the alkali metal or ammonium salts of weak acids, e.g., sodium carbonate, potassium bicarbonate, lithium carbonate, potassium acetate, potassium citrate, sodium acetate, potassium acid phosphate, etc.

It is desirable that the emulsion have a solids content between about 25 and 70 weight percent, preferably between about 35 and 65 weight percent, to yield an emulsion having the desired viscosity. Preferably, the comonomers are supplied to the polymerization at sufficient concentration to yield latexes of the aforementioned solids content. Alternatively, and less desirably, latexes of lower solids content can be concentrated by vacuum or atmospheric pressure evaporation to remove quantities of the water medium and thereby increase the solids concentration. Emulsions having solids contents below 25 weight percent have viscosities which are too low for most commercial applications, while emulsions having solids contents greater than 70 weight percent tend to form separate phases upon standing, and usually require heating before application. The solids content of the emulsion is chiefly a measure of the polymer concentration, however, other solid additives can also be present in the emulsion. The remaining component is an aqueous liquid such as water.

The amount of ethylene in the polymer is maintained from about 1 to about 20 weight percent, preferably between about 5 and 17 weight percent. Most preferably the ethylene content is maintained between 7 and about 18 weight percent of the polymer component. The amount of ethylene in the polymer can be selected by controlling the process conditions during the polymerization reaction such as total pressure, the ethylene partial pressure, the temperature, the vinyl acetate addition rate to the reactor for the amount of polymerization catalyst employed. The low ethylene content allows the adhesive composition to be formed in a stable emulsion so that it can be applied to the various surfaces at low or ambient temperature. Ethylene contents above 20 weight percent are undesirable for emulsion uses as described in this invention since the molecular weights of such polymers are generally too low and adhesives formed from the polymers have a low cohesive strength.

The monobasic acids which are reacted with glycols to form the plasticizers can have from 1 to about 10 carbons, and can comprise alkanoic acids as well as mono and dicyclic aromatic acids. Examples of these are formic, acetic, propionic, butyric, isobutyric, pivalic, valeric, caprylic, caproic, decanoic, benzoic, toluic, p-amyl benzoic, naphthoic, etc. These monobasic acids can be reacted with various glycols to form suitable plasticizers. The glycols which can be used have, in general, from 2 to about 10 carbons and can comprise the simple glycols such as ethylene glycol, propylene glycol, butylene glycol, etc., as well as the ether di- and trimers thereof, e.g., dipropylene glycol, diethylene glycol, triethylene glycol, etc.

As illustrations of various esters which can be prepared by selection of the reactants from the preceding disclosure are conventional plasticizers such as triethylene glycol di(2-ethylbutyrate), dipropylene glycol dibenzoate, etc.

The aforementioned plasticizers are employed at a concentration from about 0.1 to about 5 weight percent based on the polymer content of the emulsion. Preferably, the plasticizer is used at a concentration of from 0.5 to about 2.0 weight percent of the polymer. As previously mentioned, the polymerization is performed in the presence of the plasticizer which is preferably introduced into the aqueous polymerization medium prior to initiation of the polymerization. Alternatively, the plasticizer can be added continuously throughout the polymerization period in the manner which is commonly practiced for the addition of the vinyl acetate monomer. The amount of plasticizer in the polymerization medium during the polymerization, however, should be within the aforementioned concentration ranges based on the polymer contained in the polymerization medium.

The copolymerization reaction is initiated by a water soluble catalyst which is a free radical precursor such as a water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the catalyst or initiator is from 0.01 to 2.0 weight percent and preferably from 0.1 to 0.5 weight percent of the comonomers used in the copolymerization.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite or pyrosulfite, e.g., sodium metabisulfite, potassium metabisulfite, sodium pyrosulfite, etc. A particularly preferred reducing agent is sodium or potassium formaldehyde sulfoxylate such as FORMOPON marketed by Rohm and Hass Company. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 3 weight percent of the amount of vinyl acetate monomer, however, in a preferred embodiment the reducing agent is only employed to initiate the reaction and hence is necessary only in small amounts which is generally between about 0.001 to 0.02 weight percent of vinyl acetate monomer to be polymerized.

As previously mentioned, a protective colloid can be present in the polymerization medium. A wide range of compounds is available for use as a protective colloid, including many natural substances such as casein, various natural gums, gelatins, agar, dextrin and globulin; suitable chemically modified polysaccharides such as hydrolyzed starch, hydroxyethylcellulose, methylcellulose, carboxymethylcellulose and synthetic protective colloids such as polyvinyl alcohol. Polyvinyl alcohol is particularly suitable and can be partially or fully hydrolyzed polyvinyl alcohol which is obtained by the hydrolysis of a vinyl acetate homopolymer. The polyvinyl alcohol component has been found to impart a substantial improvement in adhesion of films formed from the emulsions to vinyl plastics.

The maximum degree of adhesion of such films to vinyl plastics is achieved when the emulsion contains between about 1 and 5 weight percent of polyvinyl alcohol. The degree of hydrolysis of the polyvinyl alcohol significantly affects the adhesiveness of the copolymer at elevated temperatures. Maximum adhesion at elevated temperatures is achieved by use of fully hydrolyzed polyvinyl alcohol. The most effective of the fully hydrolyzed polyvinyl alcohols are those which when dissolved in water at 4 weight percent concentration exhibit a viscosity from 5 to 125 centipoises at 20° C. as determined by the Hoeppler falling ball method. Exemplary of the fully hydrolyzed polyvinyl alcohol components are Gohsenol NL05, a low molecular weight fully hydrolyzed polyvinyl alcohol marketed by Bently Chemical Corporation and Elvanol 70–05, a low molecular weight, fully hydrolyzed polyvinyl alcohol marketed by E. I. du Pont de Nemours.

In addition to the fully hydrolyzed polyvinyl alcohol, other protective colloids can also be present in the emulsion without affecting the excellent adhesion of the copolymer for vinyl plastics at elevated temperatures. The presence of a second colloid can, in many instances, be advantageous since it can impart desired properties to the emulsion such as moisture resistance, emulsion stability, etc. Generally good results can be obtained when 1 to 20 parts by weight of a second protective colloid is employed along with each 10 parts of fully hydrolyzed polyvinyl alcohol. In a preferred embodiment, the second protective colloid is a partially hydrolyzed polyvinyl alcohol which is 60 to 95 percent, preferably 85 to 90 percent hydrolyzed, and has a viscosity between about 3 and 45 centipoises as determined by the Hoeppler falling ball method for a 4% aqueous solution at 20° C. Exemplary of the partially hydrolyzed polyvinyl alcohol component is Elvanol 51–05, a low molecular weight, 87–89 percent hydrolyzed polyvinyl alcohol, and Elvanol 52–22, an intermediate molecular weight, 87–89 percent hydrolyzed polyvinyl alcohol marketed by E. I. du Pont de Nemours.

The total amount of protective colloid or colloids in an emulsion, if more than one is employed, is maintained between about 0.1 and 5 weight percent based on the total emulsion weight. Good results can be obtained with a total protective colloid content between about 0.5 and 4.5 weight percent and excellent vinyl adhesion properties can be obtained using between 1 and 4 weight percent.

The emulsion can be stabilized and the polymerization improved by the use of a suitable emulsifying agent. The concentration of the total amount of emulsifying agent useful in the adhesive emulsion can be from 0.01 to 5 weight percent of the emulsion. It is recognized that the inclusion or identity of the emulsifying agents is not critical to the invention.

In the following discussion of emulsifying agents, frequent reference will be made to the cloud point of a particular agent. The cloud points which are recited are based on 1 weight percent aqueous solutions of the agent. A relatively hydrophobic agent is one having a cloud point below 190° F. and a relatively hydrophilic agent is one having a cloud point of 190° F. or above.

A single emulsifying agent can be used or the emulsifying agents can be used in combination. When combinations of emulsifying agents are used, it is advantageous to use a relatively hydrophobic emulsifying agent in combination with a relatively hydrophilic agent.

Suitable nonionic emulsifying agents include polyoxyethylene condensates represented by the following general formula:

$$R\text{-}(CH_2\text{---}CH_2\text{---}O)_nH$$

where R is the residue of a fatty alcohol, acid, amide, or amine having from 10 to 18 carbon atoms or an alkyl phenol having from 10 to 18 carbon atoms; and where $n$ is an integer of 1 or above and preferably between 5 and 30. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethlene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene amine and the like; and polyoxyethylene thioethers such as polyoxyethylene n-dodecyl thioether.

Some examples of nonionic emulsifying agents which can be used include a polyoxyethylene nonylphenyl ether having a cloud point of between 126° and 133° F. and marketed under the trademark "IGEPAL CO–630," and a polyoxyethylene nonylphenol ether having a cloud point above 212° F. and marketed under the trademark "IGEPAL CO–887." A similar polyoxyethylene nonylphenyl ether having a cloud point of about 86° F. is marketed under the trademark "IGEPAL CO–610" and is also a good emulsifying agent. Another agent is a polyoxyethylene octylphenyl ether having a cloud point of between 80° F. and 160° F. and marketed under the trademark "TRITON X–100." Other emulsifying agents include a polyoxyethylene oleyl ether having a cloud point of between 80° F. and 160° F. and marketed under the trademark "ATLAS G–3915," and a polyoxyethylene lauryl ether having a cloud point above 190° F. and marketed under the trademark "BRIJ 35."

The nonionic emulsifying agents which can be used according to this invention also include a series of surface active agents known as "PLURONICS." The "PLURONICS" have the general formula:

$$HO(C_2H_4)_a(C_3H_6O)_b(C_2H_4O)_cH$$

where $a$, $b$ and $c$ are integers between 1 and about 100. As the ratio of $b$ to $a$ and $c$ increases, the compounds become less water soluble or more oil soluble and thus more hydrophobic, while as the ratio decreases the compounds become more water soluble and less oil soluble. An example of this class is "PLURONIC L–64" which has a cloud point of about 140° F. and a polyoxypropylene chain having a molecular weight of 1500 to 1800 and a polyoxyethylene content that is 40 to 50 percent of the total weight of the molecule. Another useful example is "PLURONIC F–68," a polyoxyethylene-polyoxypropylene glycol having a cloud point of about 212° F. and a polyoxyethylene content of about 80 to 90 percent of the total weight of the molecule.

A class of highly suitable emulsifying agents are a series of ethylene oxide adducts of acetylenic glycols sold commercially under the name "SURFYNOLS." This class of compounds can be represented by the formula:

$$\begin{array}{c} R_2 \quad\quad R_3 \\ | \quad\quad\quad | \\ R_1\text{---}C\text{---}C\text{=}C\text{---}C\text{---}R_4 \\ | \quad\quad\quad | \\ H(OCH_2CH_2)_yO \quad O(CH_2CH_2O)_xH \end{array}$$

in which $R_1$ and $R_2$ are alkyl radicals containing from 3 to 10 carbon atoms, $R_2$ and $R_3$ are selected from the group consisting of methyl and ethyl, and $x$ and $y$ are integers having a sum in the range of 3 to 60, inclusive.

Representative of the "SURFYNOLS" are "SURFYNOL 465" which is an ethylene oxide adduct of 2,4,7,9-tetramethyl decynediol containing an average of 10 moles of ethylene oxide per mole of the surface active agent. "SURFYNOL 485" corresponds to "SURFYNOL 465" but contains an average of 30 moles of ethylene oxide per mole to surface active agent. "SURFYNOL 485" has a cloud point above 212° F.

Anionic emulsifying agents which can be employed herein include anionic compounds obtained by sulfonation of fatty derivatives such as sulfonated tallow, sulfonated vegetable oils and sulfonated marine animal oils. Commercially available emulsifiers of this group are TALLOSAN RC, a sulfonated tallow marketed by General Dyestuff Corporation; ACIDOLATE, a sulfonated oil marketed by White Laboratories, Inc.; and CHEMOIL 412, a sulfonated castor oil marketed by Standard Chemical Company.

Various sulfonated and sulfated fatty acid esters of mono- and polyvalent alcohols are also suitable such as NOPCO 2272R, a sulfated butyl ester of a fatty ester marketed by Nopco Chemical Company; NOPCO 1471, a sulfated vegetable oil marketed by Nopco Chemical Company; SANDOZOL N, a sulfated fatty ester marketed by Sandoz, Inc.; and STANTEX 322, an ester sulfate marketed by Standard Chemical Products, Inc.

Sulfated and sulfonated fatty alcohols are also useful as an emulsifier and include anionic agents such as DUPONAL ME, a sodium lauryl sulfate, DUPONAL L142, a sodium cetyl sulfate, DUPONAL LS, a sodium oleyl sulfate, which are marketed by E. I. du Pont de Nemours and Company; and TERGITOL 4, a sodium sulfate derivative of 7-ethyl-2-methyl, 4-undecanol, TERGITOL 7, a sodium sulfate derivative of 3,9-diethyl tridecanol-6 and TERGITOL 08, a sodium sulfate derivative of 2-ethyl-1-hexanol, which are marketed by Union Carbide Corporation, Chemical Division.

Cationic emulsifiers can also be employed and include various amines such as ETHOQUAD C/12, ETHOQUAD 0/25, ETHOQUAD 18/12, which are polyethoxylated quaternary ammonium salts marketed by Armour Industrial Chemical Company; INDULIN W-1, a lignin derivative marketed by West Virginia Pulp and Paper Co.;

KATAPOL VP–532 and KATAPOL PN–430 which are polyoxyethylated alkylamines marketed by General Aniline and Film Corporation; ROMINE O, an oleyl imidazoline marketed by Rozilda Laboratories, Inc.; TRITON X–400, a stearyldimethylbenzyl ammonium chloride marketed by Rohm and Haas Company; VARIQUAT 638, K300 and L200 which are ethoxylated quaternary, dicoco dimethyl ammonium chloride and alkenyl trimethyl ammonium chloride, respectively, and marketed by Varney Chemical Corporation; and AMINE C, O, S and T which are heterocyclic tertiary amines marketed by Geigy Industrial Chemicals.

The following table briefly summarizes the amounts of the individual components present in the latex compositions prepared by this invention:

TABLE

| Component | Broad | Preferred | Most preferred |
|---|---|---|---|
| Polymer | 25–70 | 30–65 | 35–60 |
| Ethylene | 1–20 | 5–19 | 7–18 |
| Protective colloid | 0.1–5 | 0.5–4.5 | 1–4 |
| Emulsifier | 0.01–5 | 0.1–2 | 0.1–1 |
| Plasticizer | 0.1–5 | 0.5–3 | 0.5–2 |
| Water | 75–30 | 70–35 | 65–35 |

COPOLYMERIZATION PROCEDURE

Various emulsion copolymerization techniques can be employed herein to obtain the desired copolymer, however it is preferred to conduct the polymerization reaction in a batch process using a kettle and a stirrer to maintain intimate mixing of the emulsified reactants. The polymerization can be started by charging water into the vessel along with an effective amount of a buffering agent to maintain the solution pH during polymerization between about 2 and 9, and preferably between about 4 and 8. When redox agents are employed, they can be charged to the reactor in the necessary quantities.

The polymerization can be initiated in the presence of a minor amount of a preformed latex of an ethylene-vinyl acetate copolymer. This latex can be a commercially available latex that is introduced into the reactor and is diluted by the aqueous polymerization medium contained therein or it can be a recycled portion of a previous latex product. The amount of this "seed" latex can be from 5 to about 50 weight percent, preferably from 5 to about 30 weight percent, of the final latex product expected to be produced by the copolymerization.

The reactor is purged several times with an inert gas such as nitrogen to evacuate all of the oxygen which may be present in the gas phase and thereafter purged with ethylene to obtain a relatively pure ethylene content in the gas phase at a pressure of from about 100 to 1000 p.s.i.g., and preferably from about 200 to 600 p.s.i.g. It is recognized, however, that the presence of inert gases in the reactor does not render the invention inoperable, and the polymerization reaction may proceed even through the ethylene in the gas phase is diluted with inert vapors. After the reactor is purged it can then be charged with the protective colloid, e.g., the polyvinyl alcohol mixture, emulsifier, the plasticizer, and vinyl acetate monomer and agitated to form an aqueous emulsion. It is preferred that only a small amount of the vinyl acetate monomer, such as from 0.1 to 10 weight percent of the product emulsion, and a small amount of the polyvinyl alcohol mixture, such as from 0.01 to 1 weight percent of the emulsion, be initially charged to the reactor with the plasticizer and seed emulsion, redox agent, and emulsifying agent, if one is employed. The remaining portion of vinyl acetate, and polyvinyl alcohol mixture can then be slowly charged to reactor during the polymerization reaction so that substantial monomer addition may occur on primortal copolymers. If desired, the plasticizer can be similarly added throughout the polymerization in proportion to the vinyl acetate additions.

The polymerization initiator is charged to the reactor in an amount effective for polymerization, e.g., from about 0.01 to 2 weight percent based on the total comonomers maintained therein, and the reactor is heated to polymerization temperatures which are sufficient to decompose the free radical catalyst and thereby initiate said copolymerization. Such temperatures can be from 75° to about 250° F. A preferred temperature range is from 100° to 160° F. and, most preferably, from 110° to 145° F. The initiator and reactant are stirred sufficiently to thoroughly agitate the contents of the reactor and to maintain the solids emulsified in the aqueous solution. After initiation of the reaction, the temperature of the emulsion is allowed to rise to between 160° and 185° F., and preferably between about 170° and 180° F., and maintained at the selected temperature by circulating a cooling liquid through the cooling jackets of the reactor. Preferably the bulk of the vinyl acetate and polyvinyl alcohol mixture (from 70 to 95 percent of each) is concurrently and slowly charged to the reactor with the proper amount of initiator after the emulsion temperature is maintained between about 160° and 185° F. When a redox agent is employed, the initiation and polymerization reaction can be conducted at lower temperatures and accordingly the reaction can be conducted at temperatures between about 100° F. and 160° F.

The polymerization reaction is conducted until the free vinyl acetate monomer content in the emulsion is less than 1 weight percent and preferably less than 0.6 weight percent. In the event that the free monomer content is higher than the above concentrations after a reaction period of about 4 hours, an additional amount of initiator can be charged to the reactor to reduce the monomer content or, alternatively, the reaction temperature can be increased. The reactor is then cooled and depressured and the excess ethylene gas in the emulsion is removed. When large batches of the adhesive emulsion are prepared, it may be advantageous to introduce a defoaming agent into the emulsion during the degassing procedure to prevent a large froth or foam from developing on the emulsion surface.

The adhesive compositions made by the practice of this invention have particular utility in the adhesion of vinyl plastics to solid substrates or other vinyl plastics. The adhesive latex is applied to a surface of the vinyl plastic or a conjunctive surface of a solid substrate and the treated surface or surfaces are pressed together so that the latex is contiguous to both surfaces. The latex is allowed to cure for a sufficient period, such as from 1 to 48 hours to form a laminated structure or article. Thus the adhesive latex of this invention can be used to form laminated articles comprising sheets of vinyl plastics or sheets of vinyl plastics and other solid substrates, or the adhesive latex can be used to adhere irregular shaped vinyl plastics such as tubes, etc., to solid structures. The amount of adhesive latex which is necessary in order to obtain the desired bond with the vinyl plastic varies greatly and depends upon the type and surface of the plastic employed as well as the necessary adhesive strength required. Generally, however, it is desired that the amount of latex employed will be sufficient to deposit a layer of adhesive which is from 1 to 50 mils and preferably from 4 to 20 mils in thickness.

The vinyl plastic which can be effectively employed herein, includes polyvinyl chloride, polyvinyl dichloride, polyvinyl fluoride, polyvinyl formal, polyvinylidene chloride, polyvinyl butyral, polystyrene, etc. and copolymers thereof and especially copolymers of polyvinyl chloride. Exemplary vinyl plastics which can be effectively employed herein include SEILON CR100 and SEILON HI4000, a polyvinyl chloride marketed by Seilon Inc., TEDLAR 15 and TEDLAR 25, a polyvinyl fluoride marketed by Du Pont de Nemours and SEILON 3400, a polystyrene marketed by Seilon, Inc.

The adhesive latex can be successfully applied to any solid substrate such as wood, glass, cement, metals plastics, etc., or any conventional support structure. The surface of the substrate can be relatively rough, smooth or highly polished; however, the adhesion will be better if the substrate surface is slightly rough. Thus, in one embodiment of this invention, the adhesive latex can be employed to adhere a polyvinyl chloride sheet to a wooden or metal surface.

The invention is further illustrated by the following examples which are illustrative of specific modes of this invention:

Examples

In these examples, experiments are described which illustrate the effectiveness of the plasticizer to enhance the adhesion of the copolymer films when the plasticizer is introduced into the polymerization process.

In each test, a stainless steel pressure reactor having a capacity of one gallon and equipped with a cooling jacket and stirrer is charged with 346 grams of water, 20 grams Benzoflex 9–88, a commercially available dipropylene glycol dibenzoate plasticizer, 54 grams vinyl acetate, 3.8 grams sodium bicarbonate and 0.4 gram Formopon. The resulting mixture is stirred at ambient temperatures until all of the bicarbonate and Formopon are dissolved. The reactor is then charged with 197 grams of Aircoflex 400, a commercially available ethylene vinyl acetate copolymer latex, and the contents are stirred at 300 r.p.m. for approximately 30 minutes at ambient temperature.

Oxygen is removed from the reactor by purging it twice with 100 p.s.i.g. nitrogen and three times with 100 p.s.i.g. ethylene. The reactor is then pressured to 400 p.s.i.g. with ethylene and the stirring rate is increased to 500 to 700 r.p.m.

The contents of the reactor are heated to 135° F. An aqueous initiator solution comprising an admixture of 752 grams water, 8 grams potassium persulfate, and 60 grams Elvanol 5105, a commercial polyvinyl alcohol with 89 percent hydrolysis is employed in the polymerization. After 8 grams of the initiator solution has been charged to the reactor, the remainder of the vinyl acetate monomer (989 grams) is injected into the emulsified mixture with the remainder of the initiator solution over a period of 90 minutes.

The temperature is allowed to increase to 175° F. as regulated by controlling the flow of water through the cooling jacket and the ethylene pressure is controlled at approximately 500 p.s.i.g. throughout the reaction. When the addition of all the ingredients is completed, the residual free monomer content in the emulsion is determined every half hour until it is less than about 0.6 percent. The reactor is then depressured and cooled to ambient temperature.

Experiment 2: The experiment is repeated with substitution for the Aircoflex 400 of an equal amount of a preformed latex prepared in a prior copolymerization of ethylene and vinyl acetate.

Experiment 3: The experiment is also repeated in a reactor having a capacity of 2 liters following substantially the same procedure, however, the temperature of the polymerization is controlled at 180° F.

Experiment 4: The experiment is repeated, however, the plasticizer is not added at the initiation of the polymerization, but, instead, is introduced into the latex after its formation.

Samples of each of the emulsions are analyzed for the solids content, surface tension, viscosity, percent gel, and for adhesiveness to glass and vinyl. In the adhesion tests a small amount of the emulsion is applied at ambient temperatures to a piece of glass. The amount of adhesive employed is sufficient to obtain a 2–4 mil thick film of adhesive on the pieces. A one-inch wide strip of unsupported plasticized polyvinyl chloride sheet (6 mils thick) is pressed against the coated plywood piece. The pieces are cured at room temperature for a minimum period of 16 hours. Thereafter, the vinyl film is peeled from the plywood while observing its adhesion. The dried adhesive film is also pulled from the glass piece while also observing its adhesion. The adhesions of the films are rated as poor, good or excellent, depending upon the degree of adhesion observed. The adhesion to glass is excellent when the film tears rather than separates from the glass piece and the adhesion is poor when the film readily separates without tearing. The adhesion to vinyl is excellent when the wood veneer separates or splinters. The adhesion is poor when the vinyl readily separates and leaves an intact plywood surface.

TABLE 2

| Experiment number | Percent solids | Surface tension | Viscosity | Percent gel | Adhesion to— Glass | Adhesion to— Vinyl |
|---|---|---|---|---|---|---|
| 1 | 51.9 | 43.6 | 500 | 50.8 | Excellent | Good. |
| 2 | 50.7 | 46.8 | 595 | 51.6 | Good | Excellent. |
| 3 | 46.6 | 40.6 | 385 | 56.4 | Excellent | Do. |
| 4 | 56.7 | 41.6 | 155 | 65.7 | Fair | Good. |

The adhesion of the polymer film between the vinyl and the work pieces is substantially improved when the plasticizer is present during copolymerization. This is apparent from results where it is reported that the adhesion increased from a rating of fair or good for experiment 4 to excellent in the other experiments, particularly in experiment number 3.

The preceding example is intended solely to illustrate a mode of practice of the invention and to demonstrate results obtainable thereby. It is not intended that the example be unduly limiting of the invention which is defined by the materials and steps and their obvious equivalents set forth in the following claims.

I claim:

1. In the emulsion copolymerization comonomers consisting essentially of ethylene and vinyl acetate wherein ethylene and vinyl acetate are contacted with an aqueous liquid containing from 0.01 to about 5 weight percent of an anionic or nonionic emulsifying agent and from 0.01 to about 2 weight percent, based on said comonomers, of a water soluble free radical catalyst decomposible to free radicals under polymerization conditions including a temperature from 75° to about 250° F., sufficient to form free radicals from said catalyst and thereby initiate said copolymerization, a pressure from 100 to about 1000 p.s.i.g., sufficient to form a copolymer containing from 1 to about 20 weight percent ethylene, the improvement which comprises performing said copolymerization in the presence of from 0.1 to about 5 weight percent based on the weight of the copolymer, of a plasticizer which is an ester of a monobasic alkanoic or mono or dicyclic aromatic carboxylic acid having from 1 to about 10 carbons with an alkylene glycol, dimer or trimer thereof having from 2 to about 10 carbons and recovering a latex of a polymer having enhanced adhesion to vinyl plastics and glass.

2. The copolymerization of claim 1 wherein said aqueous medium also contains from 0.1 to about 5.0 weight percent of a protective colloid.

3. The copolymerization of claim 1 wherein said pH of said aqueous medium is at a value from about 2.0 to 9.0.

4. The copolymerization of claim 1 wherein said plasticizer is dipropylene glycol dibenzoate.

5. The copolymerization of claim 1 wherein the pressure of said copolymerization is maintained sufficient to form a copolymer containing 5 to about 17 weight percent ethylene.

6. The copolymerization of claim 1 where in the pressure is maintained sufficient to form a copolymer containing from 7 to 18 percent ethylene.

7. The copolymerization of claim 1 performed in the presence of said plasticizer at a concentration of from 0.5 to 2.0 weight percent.

8. The copolymerization of claim 1 wherein said catalyst is present at a concentration from 0.1 to 0.5 weight percent.

9. The copolymerization of claim 1 which is performed also in the presence of an alkali metal metabisulfite or pyrosulfite at a concentration from 0.1 to about 3.0 weight percent, sufficient to accelerate the decomposition of said catalyst and release of free radicals therefrom.

10. The copolymerization of claim 1 performed also in the presence of an alkali metal bisulfite or pyrosulfite at a concentration from 0.001 to 0.02 weight percent and sufficient to accelerate the decomposition of said catalyst and release of free radicals therefrom.

11. The copolymerization of claim 2 wherein said protective colloid is polyvinyl alcohol.

12. The copolymerization of claim 11, wherein said polyvinyl alcohol is a fully hydrolyzed polyvinyl alcohol having the property of forming a 4 weight percent solution in water having a viscosity between 5 and 125 centipoises at 20° C. as determined by the Hoeppler falling ball method.

13. The copolymerization of claim 11, wherein a second protective colloid at a concentration of 1 to 20 parts per 10 parts of said fully hydrolyzed polyvinyl alcohol is also present, said second protective colloid comprising 85 to 90 percent hydrolyzed polyvinyl alcohol and having the property of forming a 4 weight percent solution in water having a viscosity of from 3 to 45 centipoises at 20° C. as determined by said Hoeppler falling ball method.

References Cited
UNITED STATES PATENTS

| | | | |
|---|---|---|---|
| 3,578,618 | 5/1971 | Beardsley | 260—29.6 R |
| 3,399,158 | 8/1968 | Huitson | 260—29.6 R |
| 3,312,652 | 4/1967 | Coney | 260—31.6 |
| 3,164,562 | 1/1965 | Breed | 260—31.4 R |
| 3,515,630 | 6/1970 | Columbus | 260—31.4 R |
| 2,689,836 | 9/1954 | Bier | 260—29.6 R |
| 3,399,157 | 8/1968 | Deex | 260—29.6 R |
| 3,091,597 | 5/1963 | Henriques | 260—31.4 R |

ALLAN LIEBERMAN, Primary Examiner

P. R. MICHL, Assistant Examiner

U.S. Cl. X.R.

260—31.4 R, 31.6, 31.8 R